Sept. 23, 1958    Z. V. MOUDRY ET AL    2,853,449
SLIME PREVENTATIVE COMPOSITIONS AND METHODS
Filed Sept. 2, 1955                    2 Sheets-Sheet 1
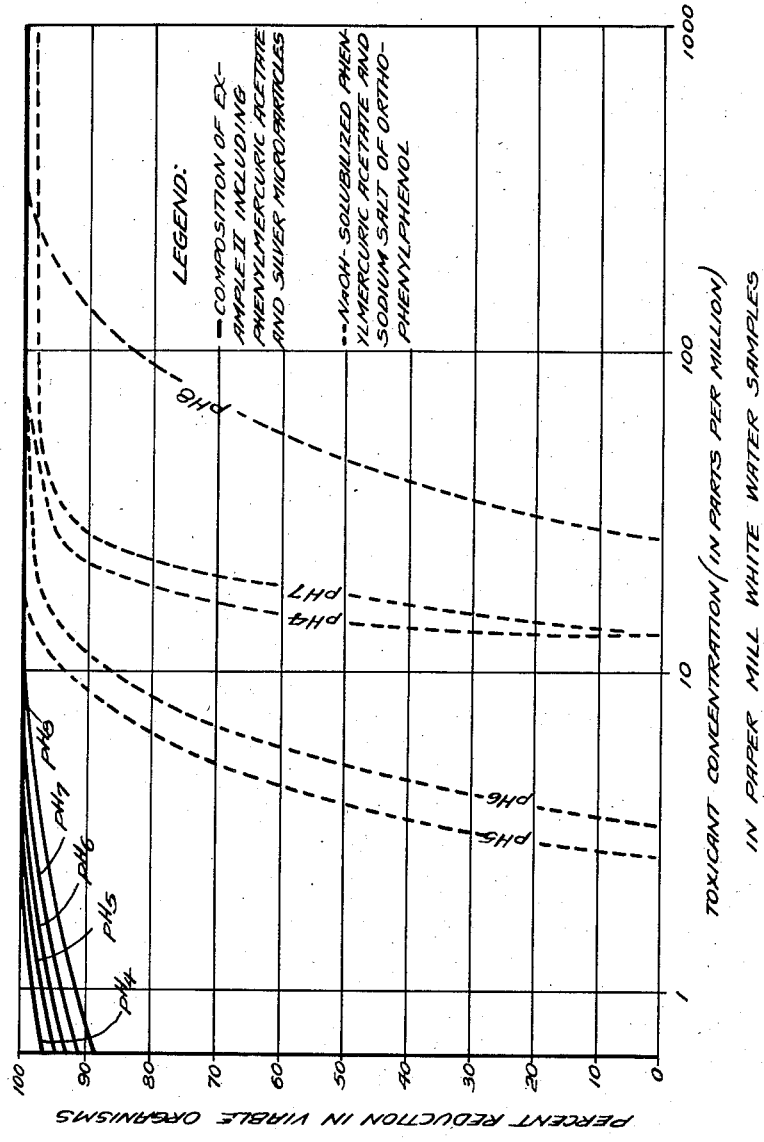
INVENTORS
ZDENEK V. MOUDRY,
MARIE K. MOUDRY,
BY Stone, Boyden & Mack
ATTORNEYS

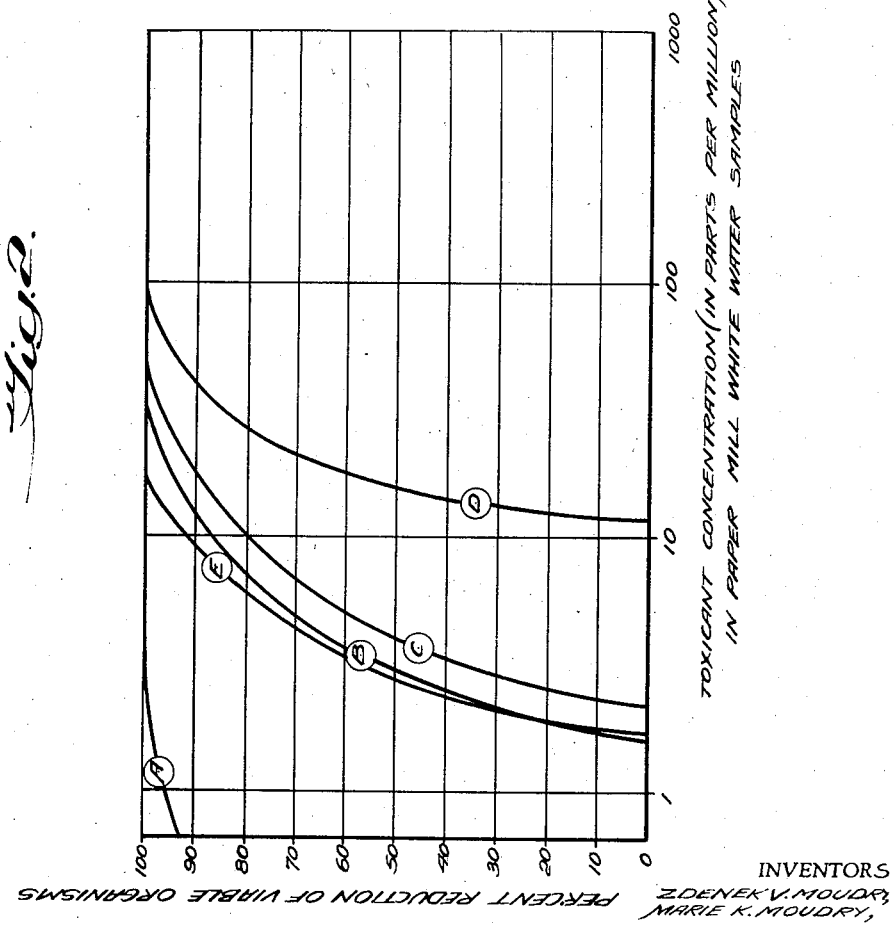

2,853,449
Patented Sept. 23, 1958

United States Patent Office

2,853,449
SLIME PREVENTATIVE COMPOSITIONS AND METHODS

Zdenek Vaclav Moudry and Marie K. Moudry, Northfield, Ill.

Application September 2, 1955, Serial No. 532,306

7 Claims. (Cl. 210—64)

This invention relates to the prevention of slime formations, especially in recirculating waters, and particularly to the control of slime producing organisms by means of phenylmercuric acetate. The invention includes new phenylmercuric acetate-containing compositions, methods for their preparation, and methods for their use in inhibiting slime formation in liquid media.

The organomercurials, and particularly phenylmercuric acetate, have long been known as slime preventatives, and phenylmercuric acetate has been used with varying degrees of success in the treatment of recirculating waters to control slime in paper mills and like installations. However, slime preventatives based on phenylmercuric acetate have not been entirely satisfactory. The primary disadvantage has been that the slime preventing capabilities of phenylmercuric acetate alone are not really adequate for many purposes. Difficulty also arises from the fact that phenylmercuric acetate is so sparingly soluble in water and other media involved that it is often not practical to uniformly distribute through the medium being treated a quantity of phenylmercuric acetate adequate to inhibit the growth of slime producing organisms. For example, in treating paper mill white water, it is possible to dissolve adequate phenylmercuric acetate by adding it in the beaters, but it is not practical to add phenylmercuric acetate at other points in the system where the water is moving rapidly. Yet, in many cases, such as plants manufacturing newsprint, the slime controlling agent should be added at such other points, rather than in the beaters.

The present invention is based upon the discovery that solutions of phenylmercuric acetate containing relatively small proportions of metallic silver microparticles are unusually effective in preventing slime formation in aqueous and other liquid media. Thus, it has been found that phenylmercuric acetate solutions produced in accordance with the present invention and containing a small amount of silver microparticles are as much as 10 times as effective, at pH 5, and well over 100 times as effective, at pH 8, in controlling slime producing organisms in paper mill white water, as are conventional solubilized phenylmercuric acetate preparations. Thus, for example, a concentration of 10 parts per million of a composition, made in accordance with the present invention, in paper mill white water at pH 8 is 100 times as effective as a concentration of 25 parts per million of solubilized phenylmercuric acetate in the same white water.

In general, compositions of the present invention comprise solutions of 5–12.5 parts by weight phenylmercuric acetate in 85–62.5 parts by weight of liquid organic solvent, with 0.3–1.0 part by weight of metallic silver microparticles uniformly distributed throughout the solution. The solvents employed are the water soluble glycols and the lower alkyl ethers thereof, e. g.:

Ethylene glycol
Diethylene glycol
Triethylene glycol
Propylene glycol
Dipropylene glycol
Hexylene glycol
Ethylene glycol monoethyl ether
Diethylene glycol monoethyl ether
2-methoxymethyl-2,4-dimethyl pentanediol - 1,5 - hexanetriol-1,2,6

The silver microparticles are advantageously predominantly smaller than 700 A. U., and best results are obtained when the silver particles are smaller than 200 A. U.

Colloidal dispersions of such fine silver particles can be prepared by reducing silver nitrate in an aqueous solution containing a special gelatin. The gelatin should have a gel strength of 125–250, a viscosity of 20–40 millipoises in 6⅔% aqueous solution at 60° C., a pH of 3–5.5 in aqueous solution, an isoelectric point of pH 7.8–8.3, and an ash analysis not exceeding 2%, the ash being substantially all calcium. The gelatin must be substantially completely free from sulfur and ionizable halogen.

Such a gelatin can be produced by acid hydrolysis of acid treated fresh-frozen pork skins. During hydrolysis, the characteristics above referred to change progressively, and the special gelatin is withdrawn as a selected fraction when these characteristics have attained the proper values. A product of this type is Knox Gelatin #841, produced by Charles B. Knox Gelatine Co., Johnstown, N. Y.

Preparations of aqueous colloidal suspensions of silver microparticles suitable for use in the invention is illustrated by the following example:

Example I

| | Parts by weight |
|---|---|
| Distilled water | 100.0 |
| Silver nitrate (reagent grade) | 5.0 |
| Gelatin | 2.5 |

The gelatin employed was Knox #841, having a gel strength of 165, a viscosity of 30 millipoises, a pH of 4.44, an isoelectric point of pH 8, and an ash analysis of 1.2%, substantially all the ash being calcium. The silver nitrate was dissolved in a portion of the water, a suspension of the gelatin in the remaining water was prepared, and the silver nitrate solution and gelatin suspension were then combined. The resulting mixture was then irradiated for 15 seconds with actinic light at an intensity of about 1,062 milliwatts per square foot, at least 40% of the total radiation being in the infrared portion of the spectrum and at least 25% in the ultraviolet portion, the ultraviolet portion of the radiation including a material proportion of light emitted at 3130 A. U. and 3660 A. U. The resulting product was a stable aqueous dispersion of silver microparticles having a median maximum dimension of 100 A. U. Silver particles smaller than 700 A. U. constituted about 3.1% by weight of the total composition. In considering this percentage, it should be noted that water amounting to about 5% by weight of the composition is lost during irradiation.

In preparing compositions in accordance with the present invention, a solution of phenylmercuric acetate in the solvent is first prepared and an aqueous colloidal suspension of silver microparticles such as the suspension of Example I is then added. It is essential, particularly when working with large volumes, that the suspension of silver microparticles be added gradually with continual agitation, else the protein content of the suspension is denatured and the silver tends to precipitate. Further, it is necessary that the silver suspension be added after, rather than before, the phenylmercuric acetate has been dissolved, else 30–50% less phenylmercuric acetate can be dissolved. The temperature of the solution must not exceed about 30° C. at the time the silver dispersion is added, else nitration of the phenylmercuric radical and the hydroxyl groups of the solvent will occur. Such nitration is noticeable if the temperature is increased to 35° C. In order that a uniform distribution of the silver microparticles in the phenylmercuric acetate solution may be maintained, the aqueous suspension of silver microparticles employed should contain 0.1–5% by weight of the gelatin, so that the gelatin amounts to 0.01–1.5% by weight of the final composition.

The following example illustrates the improved compositions of the present invention, and the method for preparing them:

*Example II*

| | Percent by weight |
|---|---|
| Phenylmercuric acetate | 8.3 |
| Composition of Example I | 17.0 |
| Diethylene glycol monoethyl ether | 74.7 |

The diethylene glycol monoethyl ether at room temperature was placed in a motorized laboratory scale mixer and an excess of phenylmercuric acetate was added. Agitation was then continued for 30 minutes and the solution filtered (the filtrate consisted of 10 parts phenylmercuric acetate and 90 parts solvent, the necessary excess of the phenylmercuric acetate to cause 10 parts to dissolve having been first determined by trial).

With the resulting solution still at room temperature, the 17 parts of aqueous colloidal silver suspension obtained in Example I was then added gradually to the solution over a period of 15 minutes with continual agitation. The resulting composition exhibited uniform dispersion of the silver microparticles, without evidence of precipitated silver. Since the aqueous silver suspension contained about 3.1% by weight of silver microparticles, the silver microparticle content of the entire composition is approximately 0.53 part by weight.

The proportional limits of compositions embodying the invention are illustrated by the following examples, wherein the procedure is the same as for Example II:

| | Parts by Weight | |
|---|---|---|
| | Example III | Example IV |
| Phenylmercuric acetate | 5 | 12.5 |
| Composition of Example I | 10 | 25.0 |
| Glycol or Glycol Ether Solvent | 85 | 62.5 |

Since the composition of Example I contains about 3.1% by weight silver microparticles, the parts by weight of silver microparticles in Examples III and IV are about 0.31 and 0.78, respectively. The silver microparticle content can be decreased to about 0.3, or increased to about 1.0 part by weight. The glycol or glycol ether solvent should not be reduced below the proportion indicated in Example IV, else it is not possible to incorporate the colloidal silver dispersion in the solution of phenylmercuric acetate without precipitating substantial quantities of gelatin and silver.

The graph of Fig. 1 indicates the effectiveness of the composition of Example II in destroying slime producing organisms in paper mill white waters at pH 4–8, as compared with a conventional composition containing solubilized phenylmercuric acetate without silver microparticles. The conventional composition consists of aqueous solution of sodium hydroxide-solubilized phenylmercuric acetate also containing sodium salts of orthophenylphenol. The tests were carried out by adding various quantities of the two compositions to samples of the white waters containing from $10^5$ to $5 \times 10^6$ organisms per cc. and allowing the treated samples to stand for a 4-hour exposure period, after which the number of viable organisms was then determined. It will be noted that, at all pH values between 4 and 8, one part per million of the composition of Example II destroyed in excess of 90% of the slime producing organisms, while about 10 parts per million of the solubilized phenylmercuric acetate composition were required to obtain this result at about pH 5.5, and over 100 parts per million of that composition were required to destroy 90% of the organisms at pH 8. As seen from Fig. 1, the compositions are not only generally more effective than conventional phenylmercuric acetate compositions, but are also unusually effective in the higher pH range.

Fig. 2 includes toxicity curves for equivalent amounts of the composition of Example II, phenylmercuric acetate alone, silver microparticles alone, silver nitrate alone, and a solution of both phenylmercuric acetate and silver nitrate in diethylene glycol. The test samples were again white water samples from paper mills and the exposure period was again 4 hours in all cases. In these tests, the phenyl mercuric acetate was not solubilized, and the silver microparticles were prepared as in Example I. The curves of Fig. 2 are of particular interest because they demonstrate that the effectiveness of the composition of Example II is markedly greater than the total of the independent effects of phenylmercuric acetate and silver microparticles. Even under conditions most favorable to phenylmercuric acetate, the independent effects of phenylmercuric acetate and silver microparticles total at most about 60% of the effectiveness of the composition of Example II at concentrations on the order of 1–5 parts per million. It is also pertinent to note from Fig. 2 that, while silver nitrate alone has a microbicidal effect approaching that of oligodynamic silver, a solution of both silver nitrate and phenylmercuric acetate is found to be little more effective than silver microparticles alone.

All of the solvents hereinbefore recited give compositions in accordance with the invention which are readily miscible with aqueous media to be treated, and the solvents are generally interchangeable. Some of the water soluble glycols and their lower alkyl ethers are more effective as solvents for phenylmercuric acetate than are others. Thus, while the diethylene glycol monoethyl ether of Example II is effective to provide a 10% solution of phenylmercuric acetate, a 14% solution may readily be prepared with ethylene glycol monoethyl ether as the solvent.

*Example V*

An excess of phenylmercuric acetate was mixed with ethylene glycol monoethyl ether to form a solution containing 14 parts by weight phenylmercuric acetate and 86 parts by weight of the solvent. The excess phenylmercuric acetate was then filtered out and 83 parts by weight of the solution placed at room temperature in a motorized bowl mixer. To this solution was then added 17 parts by weight of the composition prepared in Example I, the addition being carried out over a period of 15 minutes with continual agitation. The resulting composition, containing 11.6% by weight phenylmercuric acetate, 71.4% by weight ethylene glycol monoethyl ether and 17% by weight of the composition of Example I, exhibited all of the characteristics of the composition described in Example II. The silver microparticle content was again approximately 0.53 by weight.

It will be understood that the solvents referred to can be used in combination, rather than singly, without departing from the scope of the invention.

We have also discovered that the activity of compositions in accordance with this invention may be further enhanced by including, in addition to silver, oligodynamic copper. In such cases, the copper constitutes 0.01–0.3 part by weight of the composition, with silver remaining at 0.3–1.0 part by weight, based on a phenylmercuric acetate content of 5–12.5 parts by weight. The oligodynamic silver and copper may be prepared by simultaneously reducing a water soluble silver salt and a water soluble cupric salt, as disclosed in copending application Ser. No. 343,705, filed March 20, 1953, by Zdenek V. Moudry. The following example is illustrative:

*Example VI*

The procedure of Example I was repeated without change, except that 1.5 parts by weight cupric nitrate was dissolved along with the silver nitrate. Upon irradiation, both the silver and copper salts were reduced, yielding a dispersion containing slightly more than 3% by weight oligodynamic silver and about .4% by weight oligodynamic copper. Spectrometric analysis indicated that the silver and copper were predominantly in physically combined form, though a material proportion of individual copper and silver microparticles was present. The particle size of substantially all of the oligodynamic metal was smaller than 700 A. U. with the greater portion being smaller than 200 A. U.

A final composition was then prepared by dissolving 8.3 g. phenylmercuric acetate in 74.7 g. diethylene glycol monoethyl ether, following the procedure of Example II, and then adding 17.0 g. of the silver-copper dispersion. The resulting composition contains approximately 0.5 g. oligodynamic silver and 0.08 g. oligodynamic copper.

Compositions prepared in accordance with the present invention are useful in controlling fungi, including *Mucor spinosus, Mucor racemous, Cladosporium herbarum, Penicillium spinulosum, Pencillium cyclopium, Penicillium martensi, Aspergillus niger* and *Fusarium moniliforme,* and bacteria, including *Pseudomonas, B. subtilis, B. megatherium,* iron bacteria including the genera Clado-thrix, Leptothrix, Crenothrix, *Aerobacter aerogenes* and other members of the coliform group.

While the compositions of the invention are highly advantageous for use in any situation where slime-producing organisms are to be controlled in liquid media, they provide an especially effective solution to the problem of slime control in recirculating waters. In the case of recirculating waters, where there is usually not only a fairly large volume of liquid involved but also a large amount of apparatus surface area in contact with the liquid, it is essential that the active ingredients of the slime inhibiting composition be uniformly distributed through the liquid and that such uniform distribution be maintained during use. Compositions of the present invention are simply added to the recirculating water and uniform distribution is accomplished and maintained by recirculation of the liquid. This is a result which has been difficult to attain with phenylmercuric acetate alone, or even with the so-called "solubilized" phenylmercuric acetate compositions.

What is claimed is:
1. A composition for inhibiting formation of slimes in liquid media comprising a solution of 5–12.5 parts by weight phenylmercuric acetate in 85–62.5 parts by weight of a solvent selected from the group consisting of the water soluble glycols and lower alkyl ethers thereof, said solution also containing uniformly distributed therethrough 0.3–1.0 part by weight of metallic silver particles predominantly smaller than 700 A. U.

2. A composition for inhibiting formation of slimes in liquid media comprising a solution of 5–12.5% by weight phenylmercuric acetate in 85–62.5 by weight of a solvent selected from the group consisting of the water soluble glycols and lower alkyl ethers thereof and, uniformly dispersed in said solution, an aqueous colloidal suspension of metallic silver particles, said suspension comprising 10–25% by weight of the total composition and containing silver particles smaller than about 700 A. U. amounting to 0.3–1.0% by weight of the total composition.

3. A composition for inhibiting the growth of slime-producing organisms comprising a solution of phenylmercuric acetate having uniformly distributed therethrough 0.3–1.0% by weight of metallic silver particles smaller than about 700 A. U.

4. A method for producing a slime inhibiting compositions comprising dissolving 5–12.5 parts by weight phenylmercuric acetate in 85–62.5 parts by weight of a solvent selected from the group consisting of the water soluble glycols and the lower alkyl ethers thereof and then combining with such solution, with continual agitation and at a temperature not exceeding about 30° C., 10–25 parts by weight of an aqueous colloidal suspension of metallic silver microparticles produced by reducing silver nitrate in an aqueous solution containing, a substantial proportion of an ioniazble-halogen-free, sulfur-free gelatin having a viscosity of 20–40 millipoises, an isoelectric point of pH 7.8–8.3 and a pH of 3–5.5, said aqueous dispersion persion containing metallic silver particles amounting to 0.3–1.0 part by weight of the total composition.

5. A composition for inhibiting formation of slimes in liquid media comprising a solution of 5–12.5 parts by weight phenylmercuric acetate in 85–62.5 parts by weight of a solvent selected from the group consisting of the water soluble glycols and the lower alkyl ethers thereof, said solution also having uniformly distributed therethrough 0.3–1.0 part by weight silver and 0.01–0.3 part by weight copper, the silver and copper being in microparticulate form.

6. A method for inhibiting the formation of slimes in recirculating waters comprising uniformly combining with such waters an effective proportion of a liquid composition comprising 0.3–1.0 part by weight of metallic silver microparticles uniformly distributed in a solution of 5–12.5 parts by weight phenylmercuric acetate.

7. A method for inhibiting the formation of slimes in recirculating waters comprising incorporating in such waters an effective proportion of a liquid composition comprising 0.3–1.0 part by weight of metallic silver particles predominantly smaller than 700 A. U. uniformly distributed in a solution of 5–12.5 parts by weight phenylmercuric acetate in 85–62.5 parts by weight of a solvent selected from the group consisting of the water soluble glycols and lower alkyl ethers thereof.

References Cited in the file of this patent

UNITED STATES PATENTS

| | | |
|---|---|---|
| 1,460,012 | Berend | June 26, 1923 |
| 2,132,886 | Voelker | Oct. 11, 1938 |
| 2,183,493 | Rentschler et al. | Dec. 12, 1939 |

FOREIGN PATENTS

| | | |
|---|---|---|
| 432,101 | Great Britain | July 15, 1935 |

OTHER REFERENCES

Yagi: Rev. Phys. Chem. Japan, vol. 14, pp. 115 to 127 (1940); through Chem. Abstracts, volume 35, page 4264.